(No Model.) 2 Sheets—Sheet 1.
A. NOLL.
ELECTRIC CIRCUIT CONNECTION.
No. 481,914. Patented Aug. 30, 1892.
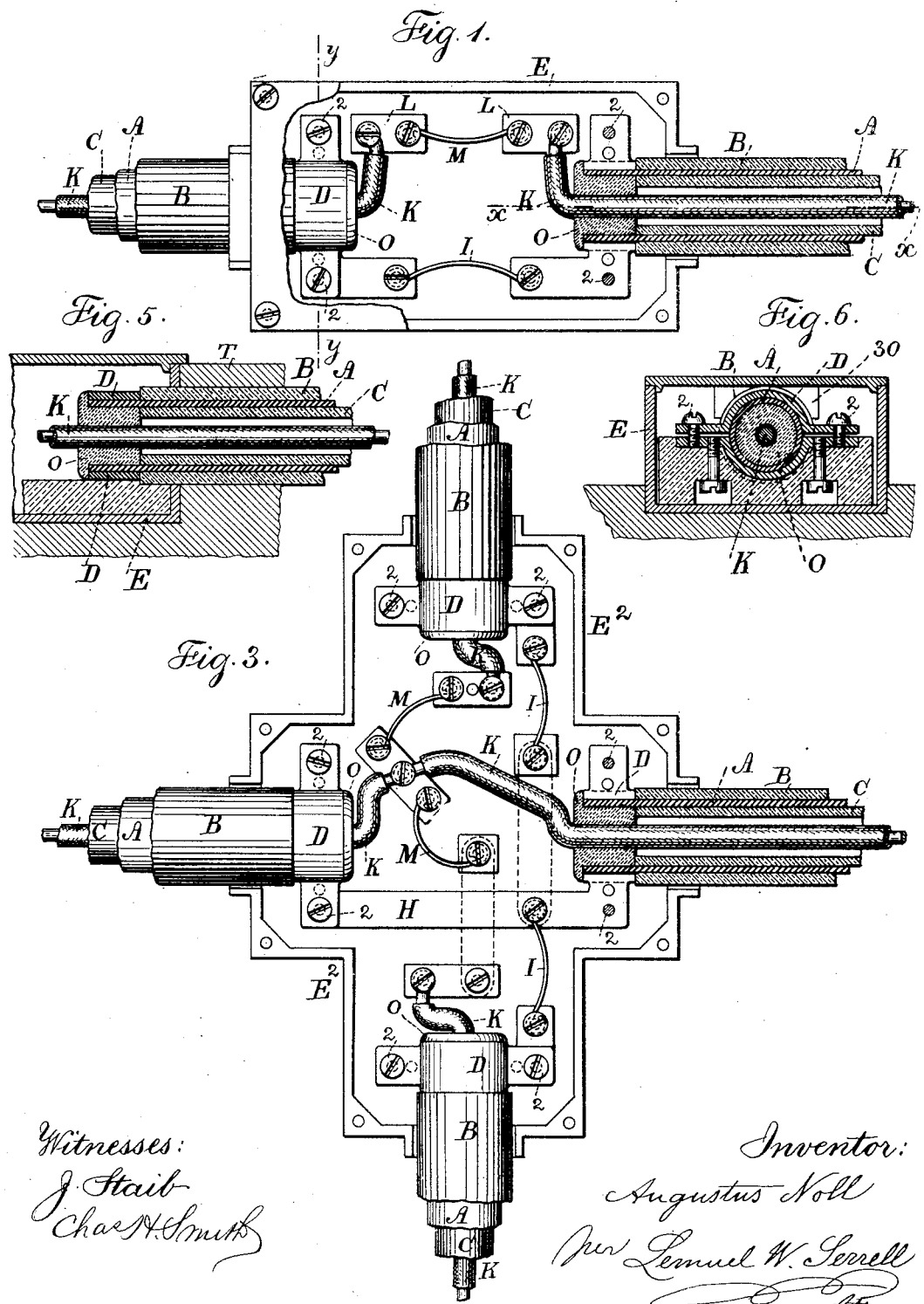
Witnesses:
J. Staib
Chas H. Smith
Inventor:
Augustus Noll
per Lemuel W. Serrell
Atty.

(No Model.) 2 Sheets—Sheet 2.
A. NOLL.
ELECTRIC CIRCUIT CONNECTION.
No. 481,914. Patented Aug. 30, 1892.
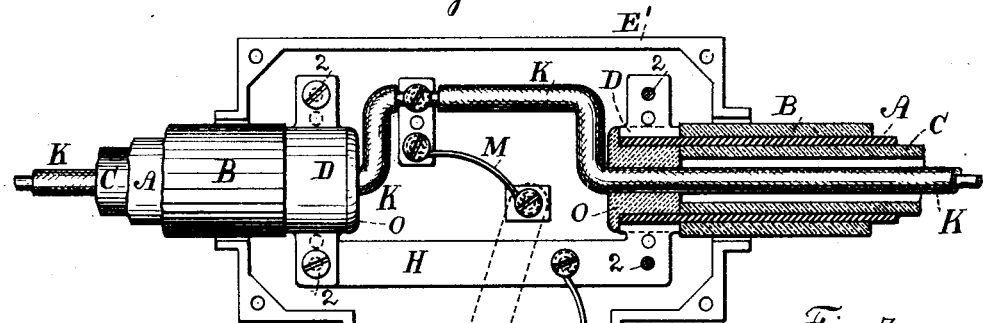
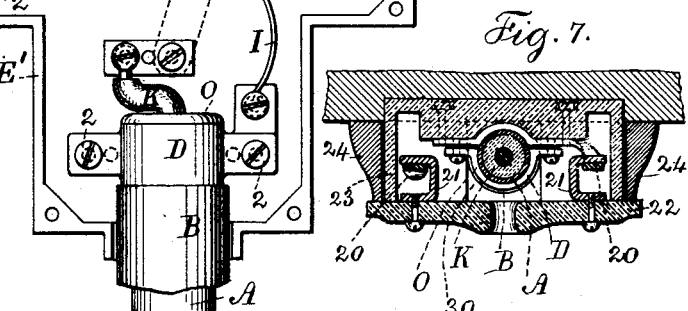
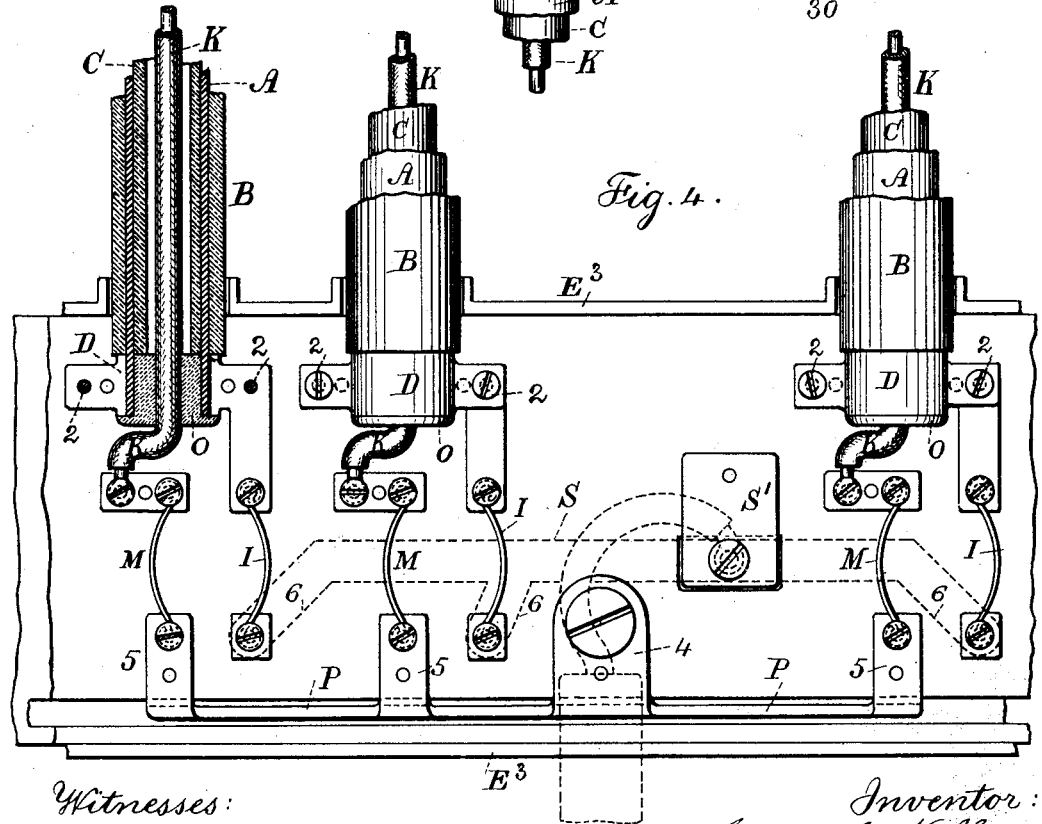
Witnesses:
J. Staib
Chas. H. Smith
Inventor:
Augustus Noll
per Lemuel W. Serrell
Atty.

UNITED STATES PATENT OFFICE.

AUGUSTUS NOLL, OF MOUNT VERNON, NEW YORK, ASSIGNOR TO ABNER J. TOWER, TRUSTEE, OF BOSTON, MASSACHUSETTS.

ELECTRIC-CIRCUIT CONNECTION.

SPECIFICATION forming part of Letters Patent No. 481,914, dated August 30, 1892.

Application filed April 28, 1892. Serial No. 431,012. (No model.)

*To all whom it may concern:*

Be it known that I, AUGUSTUS NOLL, a citizen of the United States, residing at Mount Vernon, in the county of Westchester and State of New York, have invented an Improvement in Electric-Circuit Connections, of which the following is a specification.

In applications of like date herewith I have set forth conduits for the reception of insulated electric conductors, one of such conduits being composed of metallic tubes covered with insulating material and the other a conduit composed of metallic tubes with a lining of insulating material and a covering of insulating material. In either instance where the metallic tubes are joined up by metallic couplings or brought into direct contact the metallic tubes can be employed as a return or exterior circuit, thereby lessening the risk of induction in telephone and telegraph circuits.

In my present invention I make use of conduits composed of metallic tubes covered with insulating material and connected up so as to form the return or exterior metallic circuit, and I bring these metallic tubes to junction-boxes and connect them at such junction-boxes, and the insulated conductors that are passed through the tubes are threaded through washers or plugs of insulating material that pass into the metallic tubes, so as to hold the insulated wires and exclude moisture or dust from the conduits, and these conductors are joined up with safety-switches, and the junction-boxes are adapted to the reception of the ends of two, three, or more conduits and their conductors.

In the drawings, Figure 1 represents a single junction-box, into which the ends of the conduits are received. Fig. 2 represents a junction-box with the ends of three conduits forming one main and one branch circuit. Fig. 3 represents a similar box with the ends of four of said conduits with one main circuit and two branches, and Fig. 4 represents a junction-box with three conduits passing out in the same directions. Fig. 5 is a section at the line $x\ x$. Fig. 6 is a cross-section at the line $y\ y$, and Fig. 7 is a cross-section of a ceiling-rosette with my improvements.

The metallic tubes A are inclosed with insulating material B, and the tubes may also be lined with insulating material, as at C, and the ends of the tubes A are exposed at the junction-boxes and received into clips D, which are preferably made in two parts and of metal and clamped to the tubes A by the screws 2, and the junction-boxes are formed as suitable inclosures, preferably made of non-conducting material, the inclosure or box varying in shape according to the position where it is to be used and the number of conductors that are to be received in it.

I have shown the box E, Fig. 1, as adapted to the reception of the ends of two conduits, the box E', Fig. 2, as adapted to the ends of three conduits, the box $E^2$, Fig. 3, as adapted to the ends of four conduits, and the box $E^3$, Fig. 4, as flat and adapted to the reception of conduits and conductors that are parallel to each other, or nearly so.

Where the metallic tube A is used for the external or return metallic circuit, the clips D are connected together by bars H, as seen in Fig. 2, or by fusible strips I, as seen in Figs. 1 and 4, and it is advantageous to connect the ends of the insulated metallic conductors K to the contact-blocks L within the respective boxes, and the fusible strips M may also be made use of in the circuit of the conductors K to lessen the risk of injury to the conductors themselves, and I apply at the end of each metallic tube A a plug O, which is centrally perforated for the passage of the insulated metallic conductor or conductors, so that these plugs, being of insulating material, lessen the risk of any contact between the conductor and the tubular return metallic circuit, and these plugs, being easily removed, give facility for drawing in any desired number of insulated electric conductors; and it is to be understood that the central openings in the insulating-plugs can be larger or smaller, according to the number of insulated conductors within the circuit, and each plug has a flange that comes against the end of the tube A, so as to effectually close the tube against dust or moisture, and when the conductor K is bent at right angles at the end of the plug there is no tension or strain upon the clamp-screw of the conductor and the risk of defect is lessened. The plugs also support the metal tubes under the compressing action of the clamps D.

The arrangement of the contact-blocks to which the insulated conductors are connected can be varied according to circumstances, so as to connect up the insulated conductors in any desired number or arrangement of circuits or branch circuits, the metallic tubes and their connections forming one side of the circuit or several separate exterior circuits, and I remark that the junction-boxes are to be provided with suitable removable covers.

I do not limit myself to any particular material from which these junction-boxes are to be made; but they are preferably of insulating material.

It is advantageous to use porcelain blocks at the junction-boxes and to make the circuit connections of metal plates inserted into grooves in the surfaces of the blocks, and where one circuit-plate crosses another one of the plates should be in the front surface and the other in the back surface, with portions of the plate passing through mortises to the connections on the face of the block.

When the tubes A are in the plastering T, the edges of the junction-box should be flush with the surface of the plaster, as seen in Fig. 5, and where the tubes A are upon the surface of the plastering the junction-boxes or the porcelain slabs may be let in sufficiently for the tubes to lie flush against the plastering, as in Figs. 6 and 7. In this case the sides of junction-boxes or rosette-boxes are notched at 30, so that the tubes can be removed by taking out the screws or fastenings of the cap of such box and removing the screws of the top part of the clips D to loosen the ends of the tubes.

The inner conductors K are easy of access by removing the plugs O, because the tubes A are in line with each other, are smooth on the inside, and are of larger diameter than the insulated conductors. The fusible strips or cut-outs M are shown in Figs. 1, 2, 3, and 4 in the circuits of the insulated conductors K.

The present improvements are available for either the two or three wire system, and the tubes being permanently fitted into the building are adapted to the reception of the desired conductors, and changes may be made with facility from time to time without changing conduits. Usually it is advantageous to apply junction-boxes where changes in the direction of the tubes occur; but elbows, bends, and other connections may be used with the tubes, as illustrated in my application, Serial No. 431,011, filed April 28, 1892.

Where the tubes are parallel, or nearly so, to each other in passing to the junction-box, as in Fig. 4, I prefer to use a metal plate P in a channel in the porcelain, with a branch 4 for the main conductor and branches 5 for the fusible strips or connections M, and a second metal strip S in a groove at the back of the porcelain block with branches 6, passing up through mortises in the block, with plates and screws for clamping the circuit connections or cut-outs I. The main conductors are led to the clamps S' and 4, either as insulated wires or by a tube forming one side of the circuit and a conductor therein forming the other side of the circuit, as indicated by dotted lines, Fig. 4.

When this improvement is used with a ceiling-rosette for flexible conductors, the clips D, that receive the ends of the tubes A, may be extended, as illustrated at 20, Fig. 7, for the hooks 21 on the cap 22 of the rosette-box 23, which latter is preferably of porcelain, and there is a porcelain or ornamental ring 24 around the box 23 to form an acceptable finish. This ring is notched for passing the tubes A and setting up against the ceiling, and the cap 22 and hooks 21 hold the parts in place when the cap is rotated to engage the hooks with the metal portions 20, or by the reverse movement the hooks are disconnected, so that the cap and ring can be removed to give access to the parts whenever necessary. The flexible conductors are to pass through the central hole in the cap, as usual, in ceiling-rosettes.

I claim as my invention—

1. The combination, with the insulated metallic conductors, of tubular metallic conduits inclosed in insulating material, junction-boxes and metallic clips for receiving the ends of the tubular metallic conduits, and electric connections to such clips, substantially as set forth.

2. The combination, with the insulated metallic conductors and the tubular insulated metallic conduits, of a junction-box into which the ends of the conduits pass, metallic clips for receiving and holding the exposed ends of the metallic tubular conduits, metallic connections between the respective clips and blocks, and clamp-screws for the metallic conductors, substantially as set forth.

3. The combination, with the conduit formed of a metal tube having an insulating-covering, of an insulated conductor within the conduit, a movable perforated plug through which the conductor passes, and a clamp around the metallic tube where the plug is applied for holding the tube, substantially as specified.

4. The combination, with a tubular conduit formed of a metal tube having an insulating-covering, of an insulated conductor within the conduit, and a movable perforated plug through which the insulated conductor passes and which plug is received into the open end of the conduit, and metallic clips adapted to receive and clamp the exposed ends of the metallic tubes of the conduit, and metallic connections to the clips, whereby the metallic tubes of the conduits can be used for the exterior circuit connections, substantially as set forth.

5. The combination, with the insulated metallic conductors and the metallic conduit-tubes inclosed in insulating material and having exposed ends, of metallic clips receiving and holding such exposed ends, porcelain blocks to which such clips are attached, and circuit-connecting plates or strips in grooves in the porcelain and fusible cut-out connections, substantially as set forth.

6. The combination, with the rosettes or junction-boxes, of tubular conduits and conductors passed into the notched edges of such junction-boxes and clips for holding the ends of the conduits within the boxes, so that they may be detached without removing the junction-boxes, substantially as set forth.

Signed by me this 19th day of April, 1892.

AUGUSTUS NOLL.

Witnesses:
GEO. T. PINCKNEY,
WILLIAM G. MOTT.